United States Patent [19]

Tate

[11] 4,200,151

[45] * Apr. 29, 1980

[54] SECONDARY RECOVERY PROCESS

[75] Inventor: Jack F. Tate, Houston, Tex.

[73] Assignee: Texaco Inc., White Plains, N.Y.

[*] Notice: The portion of the term of this patent subsequent to Aug. 7, 1996, has been disclaimed.

[21] Appl. No.: 877,134

[22] Filed: Feb. 13, 1978

Related U.S. Application Data

[63] Continuation-in-part of Ser. No. 752,938, Dec. 22, 1976, abandoned.

[51] Int. Cl.² .............................................. E21B 43/27
[52] U.S. Cl. .............................. 166/271; 252/8.55 C; 526/287
[58] Field of Search .................... 252/8.55 R, 8.55 C, 252/8.55 D; 166/282, 307, 271; 526/287

[56] References Cited

U.S. PATENT DOCUMENTS

| | | | |
|---|---|---|---|
| 2,596,137 | 5/1952 | Fast | 252/8.55 X |
| 2,763,326 | 9/1956 | Cardwell et al. | 252/8.55 |
| 3,679,000 | 7/1972 | Kaufman | 252/8.55 X |
| 3,749,169 | 7/1973 | Tate | 252/8.55 |
| 3,892,720 | 7/1975 | Sahnke | 526/287 |
| 3,916,996 | 11/1975 | Shupe et al. | 252/8.55 X |
| 3,923,666 | 12/1975 | Dill | 252/8.55 |

*Primary Examiner*—Herbert B. Guynn
*Attorney, Agent, or Firm*—Carl G. Ries; Thomas H. Whaley; Walter D. Hunter

[57] ABSTRACT

Significant improvement in the recovery of hydrocarbons from a subterranean hydrocarbon-bearing calcareous formation is accomplished by injecting into the formation via an injection well drilled into a formation communicating with an adjacent producing well and containing acid-soluble components which may or may not have water-sensitive clays and shales included therein, an acidic aqueous oxyalkylated acrylamido alkanesulfonic acid polymer solution whereupon the acid solution reacts with the acid-soluble components of the formation creating passageways or enlarging existing passageways thus facilitating the flow of fluids therein and thereby increasing the recovery of hydrocarbons from the formation through the adjacent producing well.

4 Claims, No Drawings

SECONDARY RECOVERY PROCESS

This application is a continuation-in-part of application Ser. No. 752,938, filed Dec. 22, 1976, now abandoned.

FIELD OF THE INVENTION

This invention relates to a process for the recovery of hydrocarbons from subterranean hydrocarbon-bearing formations containing acid-soluble components in which the permeability and porosity of the formation communicating between the producing well and adjacent injection well are increased by treating with an acidic aqueous polymer solution thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations, in fact they may be primary or tertiary in sequence of employment. In such techniques, a fluid is introduced into the formation in order to displace the oil therein to a suitable production system through which the oil may be withdrawn to the surface of the earth. Examples of displacing mediums include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many carbonate formations after only a minimal amount of the oil-in-place has been produced.

One of the remedial measures that has been used frequently to increase water-injectivity in carbonate formations is acid-treating of injection wells to improve the permeability surrounding the injection well bore, and thereby increasing the flow capabilities of the formation in the vicinity of the injection well bore. These measures, however, may result in only a temporary response in production improvement.

In acidizing an injection well utilizing the commonly employed procedure, a non-oxidizing mineral acid, such as hydrochloric acid, sulfuric acid, etc. is introduced into the injection well, and through the application of sufficient pressure is forced into the adjacent formation, where it reacts with the acid-soluble components, particularly the carbonates to dissolve them, thereby increasing the permeability of the formation adjacent the bore of the injection well. Since these strong acids have almost instantaneous rates of reaction with carbonates, the acid, therefore, necessarily spends itself in the formation immediately adjacent the injection well bore so that little beneficial effect is realized at any great distance from the well bore within the formation under treatment. Also, the strong acids may cause cavitation and eventual collapse of the formation immediately adjacent the injection well bore due to excessively rapid action of the acid. Further, subsurface equipment may be damaged severely by strong acid attack.

One method suggested to overcome the above-mentioned disadvantages has been the use of "retarded" acids which consist of a mineral acid and an additive which emulsifies the acid, a combination of which affects the acidization rate. Although such emulsified mixtures can be displaced into the formation before substantial reaction occurs, such compositions have the inherent disadvantage in that when the emulsion breaks and they do react, they usually react swiftly, often unpredictably and without substantially resolving the problem of cavitation.

The primary object of the present invention is to provide a process for the improved recovery of fluids and especially hydrocarbons from subterranean fluid-bearing formations by providing a process wherein a composition comprising an acidic aqueous solution of an oxyalkylated acrylamido alkanesulfonic acid polymer or copolymer is injected into a formation communicating between a producing well and an adjacent injection well, said formation containing acid-soluble components and in some instances also containing water-sensitive clays or shales, and whereafter the acid-soluble components of the formation are dissolved to increase permeability and porosity of the formation thereby facilitating the flow of fluids therethrough.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing acid-soluble components which may or may not have water-sensitive clays included therein, a composition comprising an acidic aqueous solution of an oxyalkylated acrylamido alkanesulfonic acid polymer or copolymer which is capable of reacting with the acid-soluble components at a reduced rate so as to increase the permeability and porosity of the formation thereby permitting a substantial increase of production of hydrocarbons from the formation via the production well.

A number of advantages result in treating subterranean hydrocarbon-bearing formations having acid-soluble components therein with the acidic aqueous polymer-containing compositions of this invention, namely:

1. The reaction rate of the acid with the formation acid-solubles, such as carbonates or dolomites, is greatly lessened. One of the most serious problems encountered in the use of mineral acids as acidizing agents, as previously mentioned, is the very rapid rate with which they react with such acid-solubles in the formation with the result that the acid necessarily spends itself in the formation immediately adjacent the injection well bore so that little beneficial effect is realized at any great distance from the bore within the formation under treatment.

2. The post-precipitation of dissolved carbonates is prevented. Because of the nature of the dissolution reaction:

when the pressure decreases a distance from the injection well bore and carbon dioxide breaks out of solution, or if carbon dioxide partitions into the oil phase, the solid calcium carbonate can reprecipitate within the formation, plugging capillaries and reducing permeability. Such an event can reduce injectivity and accordingly rate of production especially if it occurs near the wellbore. Maintenance of a low pH due to the presence of unspent acid at or near the wellbore prevents post-precipitation of carbonates.

3. The viscosity of the displacing acidic fluid is increased. The viscosities of oil present in subsurface geologic formations and its displacing fluid are important factors in the determination of the effectiveness with which oil is pushed through the pore space of said oil-bearing formation and the degree to which the oil is permitted to remain upon formation surfaces (such as sand grains) as residual oil. When the displacing fluid is lower in viscosity than the oil to be displaced, the high viscosity oil is not mobilized and the low viscosity displacing fluid moves ahead. This phenomenon is referred to as "viscous fingering". Thus, low recoveries generally are obtained from reservoirs where oil viscosity is high where water flooding is practiced.

4. The polymer solutions utilized are shear-stable.

5. The polymers employed are stable at high temperatures.

In addition to the obvious benefits of retarding the reaction rate of mineral acid upon reservoir rock (i.e., more uniform and deeper penetration and prevention of formation cavitation), the enhanced viscosity achieved also permits the acidizing system to move through a fracture with relatively small and relatively easily controllable amounts of fluid loss into the fracture walls.

DESCRIPTION OF THE INVENTION

The method of the present invention in its broadest embodiment comprises introducing via an injection well drilled into a hydrocarbon-bearing formation containing acid-soluble components and communicating with a producing well a fluid composition comprising an acidic aqueous solution of an oxyalkylated acrylamido alkanesulfonic acid polymer or copolymer in amounts sufficient to react with the formation so as to increase substantially the flow capability of the formation and to thereafter produce hydrocarbons from the said subterranean formation at an increased rate through the production well. The average molecular weight of the oxyalkylated acrylamido alkanesulfonic acid polymer or copolymer utilized in the method of this invention generally will be from about 1,000 to about 1,000,000 or more and, preferably, from about 1,000 to about 400,000.

Highly advantageous results are realized in the recovery process of this invention when the polymers employed are water-soluble oxyalkylated acrylamido alkanesulfonic acid polymers having recurring units of the formula:

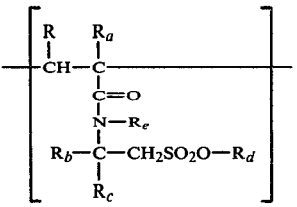

wherein R, $R_a$, $R_b$ and $R_c$ are independently selected from the group consisting of hydrogen and alkyl having from 1 to 5 inclusive carbon atoms, $R_d$ is selected from the group consisting of hydrogen and $-(C_2H_4O)_mM$, wherein m is an integer of from 1 to about 20 and M is selected from the group consisting of hydrogen, sodium, potassium and ammonium and $R_e$ is selected from the group consisting of hydrogen and $-(C_2H_4O)_sM$ wherein s is an integer of from 1 to about 20 and with the proviso that when $R_d$ is hydrogen then $R_e$ is $-(C_2H_4O)_sM$ and when $R_e$ is hydrogen then $R_d$ is $-(C_2H_4O)_mM$.

Preferably, the acidic aqueous treating composition of this invention injected into the hydrocarbon-bearing formation comprises an aqueous solution of about 2 to about 30 percent by weight of a mineral acid selected from the group consisting of hydrochloric and sulfuric acid which may or may not include brine and which contains dissolved therein between about 0.1 to about 10 percent by weight based on the total solution weight of the water-soluble oxyalkylated acrylamido alkanesulfonic acid polymer or copolymer.

The oxyalkylated acrylamido alkanesulfonic acids polymers employed show a high degree of compatibility (i.e., no reaction) with inorganic salt solutions of compounds such as magnesium chloride, calcium chloride, barium chloride, sodium chloride, etc. As expected, the intrinsic viscosity increases with concentration and molecular weight (degree of polymerization). One of the unique characteristics of the cited polymer lies in the large increase in viscosity in aqueous acidic solutions thereof as the acidity is increased.

The oxyalkylated acrylamido alkanesulfonic acid compounds utilized in preparing the polymers and copolymers employed in the novel treating compositions of this invention can be prepared by methods well known in the art. For example, the alkylene oxide can be reacted with the acrylamido alkanesulfonic acid dissolved in a suitable solvent throughout which an alkaline catalyst, such as potassium hydroxide or sodium hydroxide, is uniformly dispersed. The quantity of the catalyst utilized generally will be from about 0.15 to about 1.0 percent by weight of the reactants. Preferably, the reaction temperature will range from about 80° C. to about 180° C. while the reaction time will be from about 1 to about 20 hours or more depending on the particular reaction conditions employed. This process is more completely described in U.S. Pat. No. 2,425,845.

Oxyalkylated, acrylamido alkanesulfonic acid compounds containing block polypropylene and polyethylene groups can be prepared by well-known methods such as taught, for example, in U.S. Pat. Nos. 3,062,747; 2,174,761 or in 2,425,755. In general, the acrylamido alkanesulfonic acid initiator procedure consists in condensing with propylene oxide in the presence of an oxyalkylation catalyst until the required amount of the oxide has reacted then continuing the oxyalkylation reaction with the ethylene oxide until the desired block oxyalkylated polymer is formed.

The oxyalkylated acrylamido alkanesulfonic acid monomers can be homopolymerized, for example, in distilled water at 30° to 95° C. in 2 to 5 days or more and the reaction rate and extent of polymerization can be considerably increased by the addition of catalysts such as ferrous sulfate, heptahydrate, hydrogen perioxide, etc.

Copolymers useful in the novel treating compositions are prepared by copolymerizing (A) an oxyalkylated acrylamido alkanesulfonic acid of the formula:

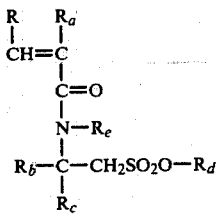

wherein R, $R_a$, $R_b$, $R_c$, $R_d$ and $R_e$ have the same meaning as described above and (B) acrylamide and acrylic acid, acrylonitrile, maleic anhydride, N-vinylpyrrolidone, hydroxyethyl acrylate and buthoxyethylacrylate, etc. Generally about 60 to about 90 percent by weight of the copolymer will comprise recurring units derived from (A) above. The useful copolymers may be prepared by a variety of polymerization techniques well known in the art such as solution copolymerization, slurry copolymerization, etc. utilizing a wide variety of catalysts such as sodium lauryl sulfate, sodium metabisulfite, ammonium persulfate, azo-bisisobutyronitrile, ferrous sulfate heptahydrate, hydrogen perioxide, etc.

The acidic polymer solutions employed in the process of this invention preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, resin-amine type inhibitors, as illustrated in U.S. Pat. No. 2,758,970, may be utilized. A small but effective amount of the inhibitor is employed which generally ranges from about 0.02% to about 1.5% by weight of the acidic aqueous polymer solution.

In the first step of preparing the acidic aqueous polymer composition of this invention, a solution containing from about 3 to about 30% by weight of a non-oxidizing mineral acid, such as hydrochloric acid, in water is prepared. An inhibitor to prevent corrosion of the metal equipment associated with the wells is usually added with mixing in the next step. The required amount of the polymer is then admixed with the aqueous acid solution employing a blender whereupon the polymer dissolves at a rather rapid rate.

The process of this invention can be carried out with a wide variety of injection and production systems which will comprise one or more wells penetrating the producing strate or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L. C., *Petroleum Production Engineering-Oil Field Exploitation*, Second Edition, McGraw Hill Book Company, Inc., New York, 1939, and to U.S. Pat. Nos. 3,472,318 and 3,476,182.

In conducting the process of this invention, the acidic aqueous polymer solution prepared as described above is forced, usually via a suitable pumping system, down the well bore of an injection well and into the producing formation through which it is then displaced together with hydrocarbons of the formation in the direction of a production well.

The formation may be treated continuously with polymer solution or such treatment may be temporary. If desired, however, after a time, conventional flooding may be resumed, in which case injectivity is permeanently increased due to acidization in depth and sweep efficiency is increased due to the increased viscosity. The acidic aqueous polymer solution of this invention also may be applied in a modified water flood operation in which there is first injected into the well bore a slug of the acidic aqueous polymer solution which is forced under pressure into the subterranean formation. This first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and conditions for the subsequent injection of the aqueous drive medium.

It should be understood that the concentration of the polymer and the acid may be chosen to provide a displacing fluid of the desired rheological properties. Similarly, the appropriate molecular weight polymer is selected on the basis of the formation being treated as well as other operating conditions employed.

EXAMPLE I

Through a water injection well drilled into a limestone formation there is displaced under pressure down the tubing and into the formation at a depth of 9035'–9060' an acidic aqueous polymer solution containing 0.55% by weight based on the total weight of a polymer having a molecular weight of about 110,000 and consisting essentially of recurring units of the formula:

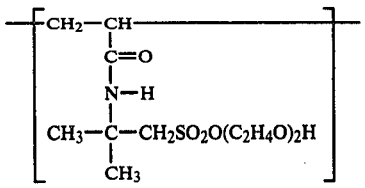

dissolved in a 4% by weight aqueous solution of hydrochloric acid at a rate of 110 barrels per day. After about 4 days injectivity increased markedly so that the production of hydrocarbons from an adjacent producing well is substantially increased over that obtained utilizing water as the drive fluid.

EXAMPLE II

A flooding operation is carried out in an oil-containing reservoir in accordance with the process of this invention. Four injection wells are arranged in a rectangular pattern around a single centrally located production well in this system. A slug consisting of 60 barrels of an acidic aqueous polymer solution containing 0.5 percent by weight based on the total weight of the solution of a random copolymer of average molecular weight of about 300,000 and having about 20% by weight of recurring units of the formula:

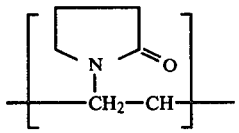

and with the balance being recurring units of the formula:

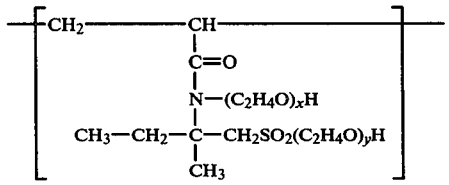

wherein the sum of x+y is 5, dissolved in a 2% by weight aqueous solution of hydrochloric acid is displaced via each of the four injection wells into the formation at a rate of 50 bbl/day. In the next step, 400 barrels of water are injected under pressure into the producing formation through each injection well at a rate of about 55 bbl/day. This sequence of operations is repeated, resulting in an increased injection rate of the drive streams into the injection wells and the production of hydrocarbons via the production well is significantly increased.

What is claimed is:

1. A process for recovering hydrocarbons from a hydrocarbon-bearing formation containing acid-soluble components having at least one injection well and at least one production well penetrating the said formation and in fluid communication, which comprises displacing through the formation a composition comprising an acidic aqueous polymer solution and recovering hydrocarbons through the production well, the said acidic aqueous polymer solution comprising about 0.1 to about 10 percent by weight based on the total solution weight of an oxyalkylated acrylamido alkanesulfonic acid polymer dissolved in an aqueous solution of a mineral acid selected from the group consisting of hydrochloric acid and sulfuric acid, and wherein the said oxyalkylated acrylamido alkanesulfonic acid polymer comprises recurring units of the formula:

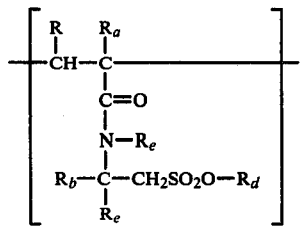

wherein $R$, $R_a$, $R_b$ and $R_c$ are independently selected from the group consisting of hydrogen and alkyl having from 1 to 5 inclusive carbon atoms, $R_d$ is selected from the group consisting of hydrogen and $-(C_2H_4O)_mM$, wherein m is an integer of from 1 to about 20 and M is selected from the group consisting of hydrogen, sodium, potassium and ammonium and $R_e$ is selected from the group consisting of hydrogen and $-(C_2H_4O)_sM$ wherein s is an integer of from 1 to about 20 and with the proviso that when $R_d$ is hydrogen, then $R_e$ is $-(C_2H_4O)_sM$ and when $R_e$ is hydrogen, then $R_d$ is $-(C_2H_4O)_mM$, and wherein the average molecular weight of the polymer ranges from about 1,000 to about 1,000,000.

2. The process of claim 1 wherein the said mineral acid is hydrochloric acid.

3. The process of claim 1 wherein the said polymer is dissolved in about 2 to about 30% by weight of an aqueous solution of the mineral acid.

4. The process of claim 1 wherein the said oxyalkylated acrylamido alkanesulfonic acid polymer is a water-soluble copolymer of (A) a compound of the formula:

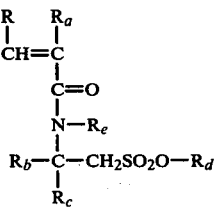

wherein $R$, $R_a$, $R_b$ and $R_c$ are independently selected from the group consisting of hydrogen and alkyl having from 1 to 5 inclusive carbon atoms, $R_d$ is selected from the group consisting of hydrogen and $-(C_2H_4O)_mM$, wherein m is an integer of from 1 to about 20 and M is selected from the group consisting of hydrogen, sodium, potassium and ammonium and $R_e$ is selected from the group consisting of hydrogen and $-C_2H_4O)_sM$ wherein s is an integer of from 1 to about 20 and with the proviso that when $R_d$ is hydrogen, then $R_e$ is $-(C_2H_4O)_sM$ and when $R_e$ is hydrogen, then $R_d$ is $-(OC_2H_4O)_mM$, and (B) a monomer selected from the group consisting of acrylamide, acrylic acid, acrylonitrile, maleic anhydride, N-vinylpyrrolidone, hydroxyethyl acrylate and butoxyethyl acrylate and wherein about 60 to about 90 percent by weight of the said copolymer is derived from compound (A).

* * * * *